(12) United States Patent
Shibamura et al.

(10) Patent No.: US 7,692,119 B2
(45) Date of Patent: Apr. 6, 2010

(54) REFLOW FURNACE

(75) Inventors: Motomu Shibamura, Tokyo (JP); Kouichi Miyazaki, Tokyo (JP); Motohiro Yamane, Tokyo (JP)

(73) Assignee: Tamura FA System Corporation, Sayama-shi (JP)

( * ) Notice: Subject to any disclaimer, the term of this patent is extended or adjusted under 35 U.S.C. 154(b) by 937 days.

(21) Appl. No.: 11/476,851

(22) Filed: Jun. 29, 2006

(65) Prior Publication Data

US 2007/0045382 A1 Mar. 1, 2007

(30) Foreign Application Priority Data

Jun. 30, 2005 (JP) .............. 2005-192710

(51) Int. Cl.
F27B 9/10 (2006.01)
H05K 3/34 (2006.01)
B23K 1/012 (2006.01)

(52) U.S. Cl. .................. 219/400; 219/388; 228/180.21

(58) Field of Classification Search ................ None
See application file for complete search history.

(56) References Cited

U.S. PATENT DOCUMENTS 5,440,101 A * 8/1995 Cox et al. ................ 219/388
5,672,260 A * 9/1997 Carey et al. .............. 205/118

FOREIGN PATENT DOCUMENTS

| JP | 2-303674 | 12/1990 |
|----|----------|---------|
| JP | 3-8565 | 1/1991 |
| JP | 9-108828 | 4/1997 |
| JP | 2682138 | 8/1997 |
| JP | 2002-198642 | 7/2002 |
| JP | 2002-331357 | 11/2002 |
| JP | 2003-33867 | 2/2003 |
| JP | 2004-214535 | 7/2004 |

OTHER PUBLICATIONS

U.S. Appl. No. 11/476,874, filed Jun. 29, 2006, Shibamura, et al.

* cited by examiner

*Primary Examiner*—Joseph M Pelham
(74) *Attorney, Agent, or Firm*—Oblon, Spivak, McClelland, Maier & Neustadt, L.L.P.

(57) ABSTRACT

In the first buffering area provided between the inlet of the furnace and the heating chamber, the ambient gas is blown to the printed circuit board from the lower side of the carrier device, while the ambient gas is sucked in the upper side of the carrier device, thus the outside air is prevented from infiltrating and the ambient gas is prevented from flowing out. Furthermore, the flux is prevented from being attached to the printed circuit board, by installing the flux dropping prevention mechanism in the suction port of the ambient gas.

19 Claims, 11 Drawing Sheets

FIG.3
(a)
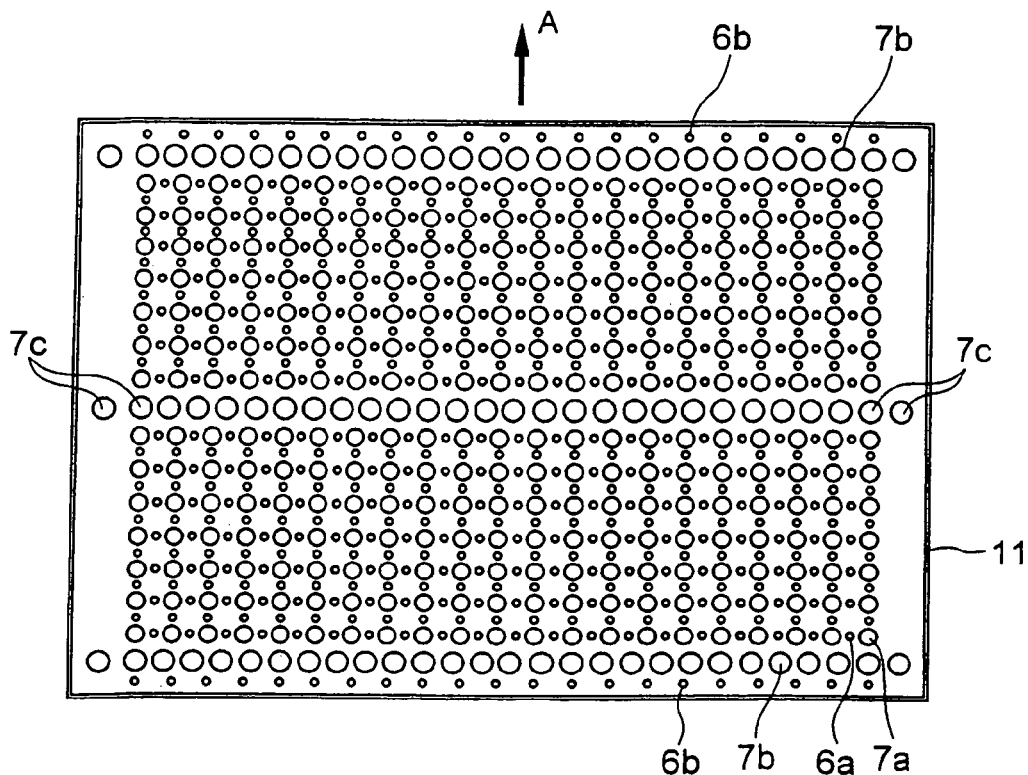
(b)
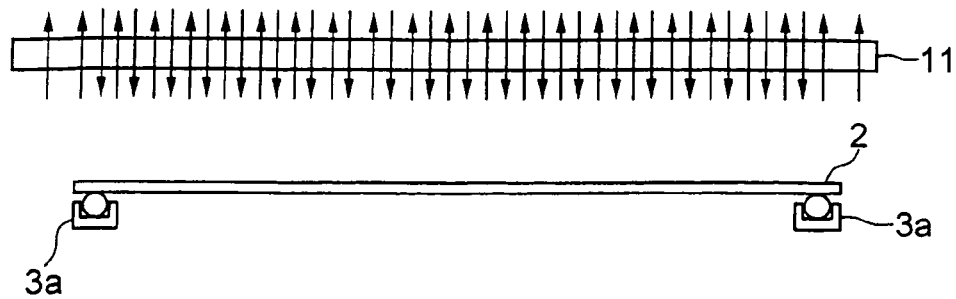

FIG.6
(a)
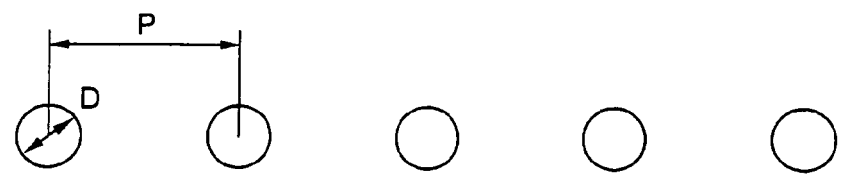
(b)
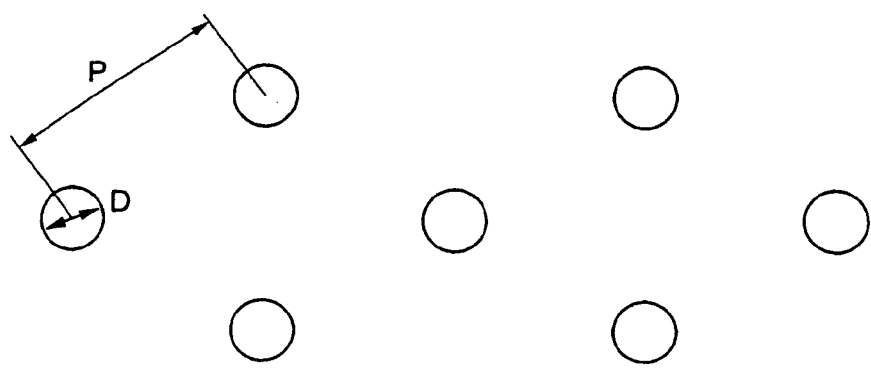
(c)
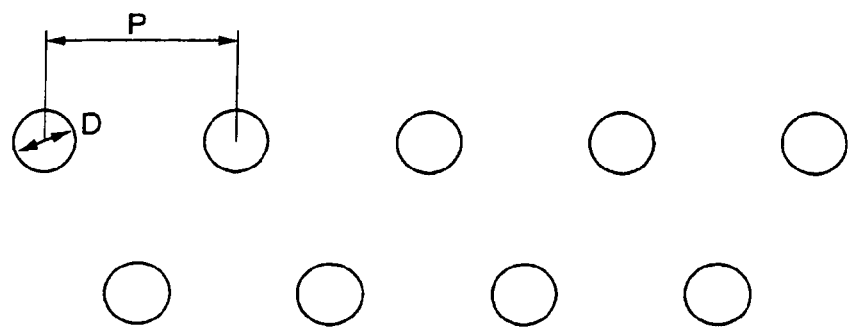

FIG. 11
(a)
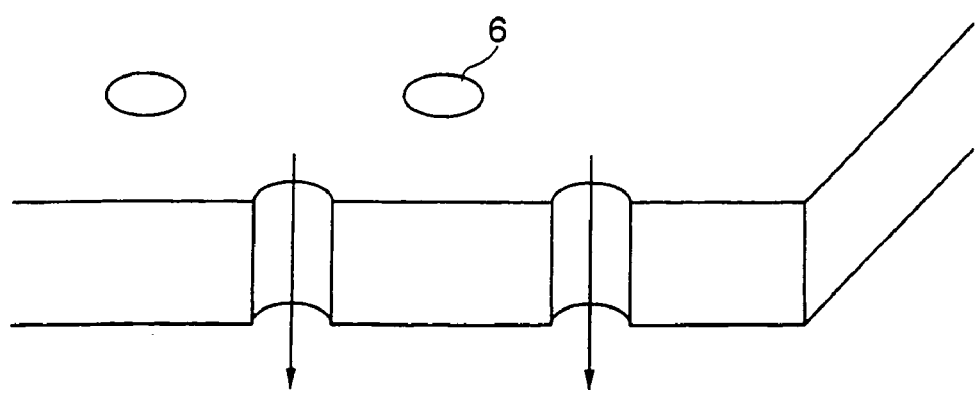
(b)
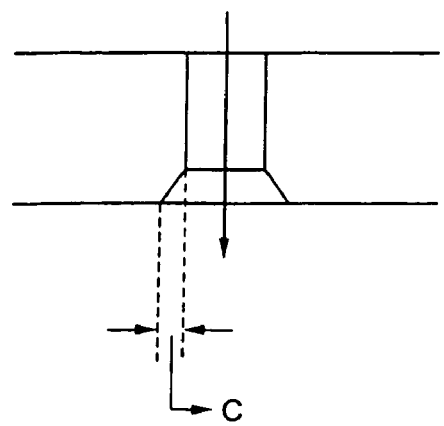

FIG.12
(a)
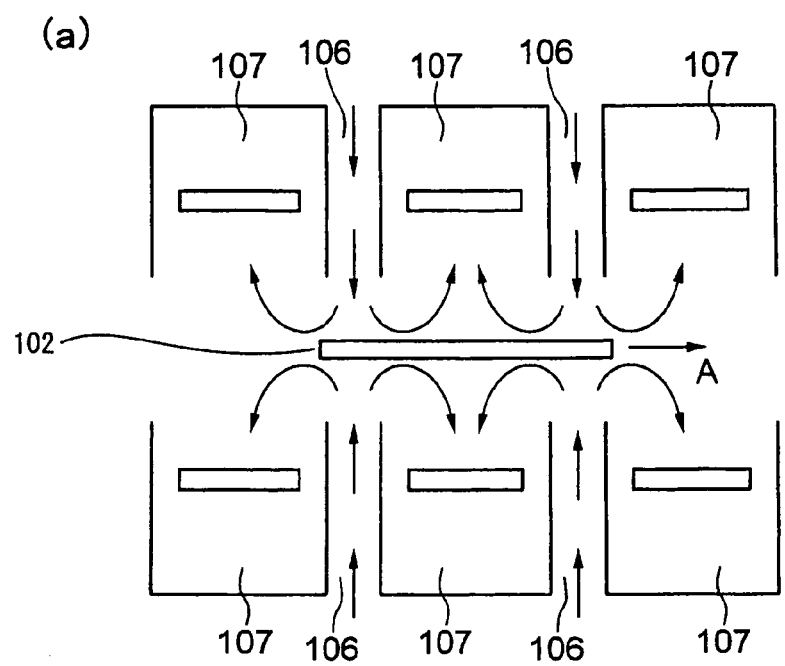
(b)
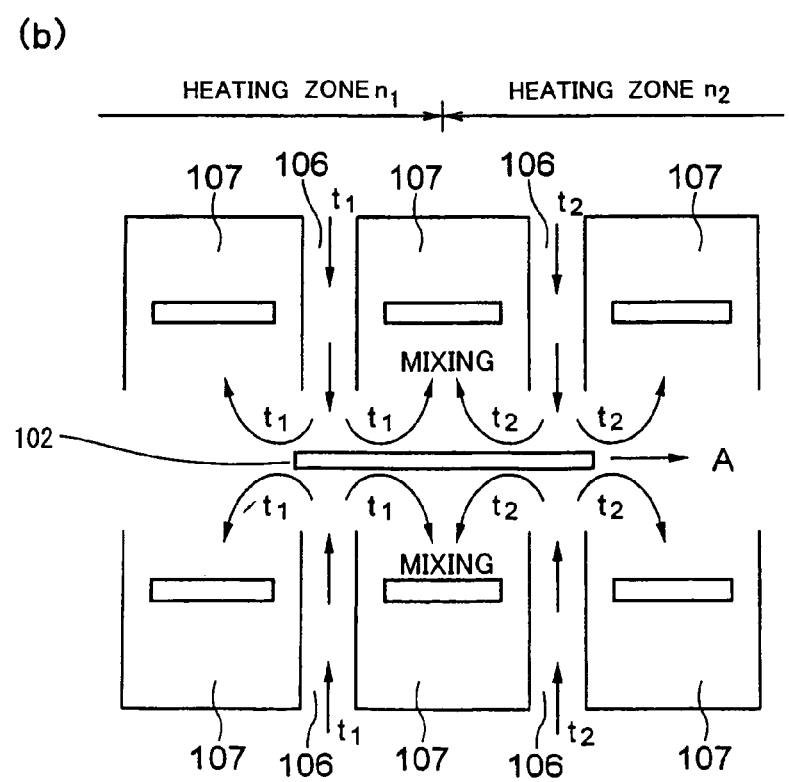

REFLOW FURNACE

TECHNICAL FIELD

The present invention relates to a heating device to blow a hot air to a printed circuit board mounting electronic components in inert gas such as nitrogen or the like, and a reflow furnace in which the printed circuit board mounting electronic components is heated and soldered by the use of the heating device.

RELATED ARTS

Recently, SMDs (Surface Mounted Devices) in which various electronic components are mounted on a surface of a printed circuit board and soldered, have been widely used for electronics devices. When the SMD is manufactured, the electronic components are mounted on the printed circuit board with a cream solder printed and the printed circuit board is heated to be soldered in the reflow furnace.

The reflow furnace is a heating furnace in which the printed circuit board is heated to melt the solder while the printed circuit board is horizontally transferred by a carrier device in the furnace, thus soldering the printed circuit board and the electronic devices mounted thereon. The reflow furnace has a sealed construction in which the printed circuit board is heated in an ambient gas such as nitrogen or the like, thus preventing oxidation during the soldering.

As the heating device of the printed circuit board, there is widely used the heating device in which hot air is blown to the printed circuit board to melt solder. The heating device includes a circulation fan to circulate an ambient gas in the reflow furnace, a heater to heat the circulating ambient gas, and a blowing nozzle to blow the heated ambient gas to the printed circuit board. The heating device is installed upper side and lower side of the printed circuit board, respectively to heat the upper face and the lower face of the printed circuit board.

The heating method using the heating device is explained hereunder.

The ambient gas is circulated in the furnace by the circulation fan. The circulating ambient gas is heated by the heater and then blown to the printed circuit board through the blowing nozzle to heat the printed circuit board. Then, the ambient gas is sucked though the circulation fan to circulate in the furnace, and then heated by the heater. The above described cycle is repeated. Thus, the printed circuit boards which are carried though the inlet port of the furnace are heated.

How to blow the hot air to the printed circuit board is important in order to effectively heat the printed circuit board in the heating device. There are proposed various blowing nozzle to blow hot air.

A heating device is disclosed in Japanese Patent No. 2682138, as an example.

FIG. 12 shows a heating method of heating the printed circuit board by the heating device. The printed circuit board 102, as shown in FIG. 12(a) is transferred within the furnace in a direction as denoted by an arrow A by a carrier device (not shown). The ambient gas heated in the hot air generating portion (not shown) is blown though the blowing nozzle 106 to the printed circuit board. A discharge space 107 for sucking the blown hot air. The blowing nozzle 106 and the discharge space 107 are arranged with an interval shorter than the length of the printed circuit board 102.

The flow of the hot air is depicted by an arrow in FIG. 12(a). The heated ambient gas is blown out through the blowing nozzle 106 to hit the printed circuit board 102 to heat the same in the heating device. The ambient gas heating the printed circuit board and bounced there is sucked in the discharge space 107, and returned to the hot air generating portion, thus the same cycle is repeated.

In general, the cooled air bounced and returned has to be prevented from being caught in the blowing air in order to improve the heat transfer coefficient during heating the printed circuit board in the reflow furnace in which the heating device is included to blow hot air to the printed circuit board to melt the solder.

Japanese Patent No. 2682138 discloses a method of preventing the cooled returned air from being caught in which hot air is positively discharged with the discharge space 107 provided between the blowing nozzles 106.

The reflow furnace includes a plurality of the heating zones. The temperature of the blown ambient gas varies in each of the zone to gradually heating the printed circuit board to solder. The temperature of the ambient gas set in the respective heating zones and the flow of the ambient gas are shown in FIG. 12(b). More specifically, there is schematically shown the flow of the ambient gas in FIG. 12(b) in which the temperature of the ambient gas is set to be t1 in the heating zone n1, and the temperature of the ambient gas is set to be t2 in the heating zone n2.

The air bounced back from the printed circuit board is sucked in the discharge space 107, thus preventing the air from being caught. However, as clear from the figure, the ambient gas with the temperature t1 and the ambient gas with the temperature t2 are mixed in a border region between the heating zone n1 and the heating zone n2. Thus, even though the temperature is respectively set in each of the heating zones, the ambient gas is interfered in the border region of the heating zones so that it becomes difficult to control the temperature.

Accordingly, it becomes difficult to rise the temperature of the printed circuit board in accordance with an optimum temperature curve according to the heating conditions preset in the respective heating zones, thus deteriorating the quality of the soldering, and lowering efficiency to heat the printed circuit board.

An object of the invention is to overcome the above described problems and provide a reflow furnace including the heating device in which the ambient gas is prevented from being interfered between the heating zones, and the printed circuit board is heated under the predetermined temperature condition to improve the quality of the soldering and realize high heating efficiency.

SUMMARY OF THE INVENTION

In order to solve the above described problems, inventors extensively have studied and repeated experiments. As a result, it is found that when a blowing panel having a prescribed shape or the like is arranged, it be comes possible to finely control the temperature in each of the heating zones, thus improving the heat transfer coefficient of the printed circuit board so that the temperature of the printed circuit board is effectively raised. More specifically, it is found that the heat transfer coefficient of the printed circuit board is improved, when a seal line and suction exclusive line and mixed region are formed in the blowing panel, and a ratio of the area of the suction port to the area of the blowing port, as well as a ratio of the blowing pressure to the suction pressure in the panel are adjusted.

A first embodiment of the reflow furnace of the invention heating a printed circuit board carried by a carrier device comprising:

a circulation fan to circulate an ambient gas;

a heater to heat the ambient gas;

a plurality of blowing ports having a prescribed total area to blow the ambient gas heated by the heater to a printed circuit board;

a plurality of suction ports having a prescribed total area to suck the ambient gas, a ratio of the total area of the suction ports to the total area of the blowing ports being within a range from 3.0 to 6.0.

A second embodiment of the reflow furnace of the invention heating a printed circuit board carried by a carrier device comprises:

a circulation fan to circulate an ambient gas;

a heater to heat the ambient gas;

a plurality of blowing ports each having a tapered portion which has a horizontal length of up to 0.5 mm at an outlet to blow the ambient gas heated by the heater to a printed circuit board;

a plurality of suction ports to suck the ambient gas.

A third embodiment of the reflow furnace of the invention heating a printed circuit board carried by a carrier device comprises:

a circulation fan to circulate an ambient gas;

a heater to heat the ambient gas;

a plurality of blowing ports to blow the ambient gas heated by the heater under a prescribed pressure to a printed circuit board;

a plurality of suction ports to suck the ambient gas under a prescribed pressure, a ratio of a blowing pressure of the ambient gas at the blowing ports to a suction pressure of the ambient gas at the suction ports being set to be within a range from 3.5 to 6.5.

In a fourth embodiment of the reflow furnace of the invention, said blowing ports and said suction ports are provided on a same plane.

In a fifth embodiment of the reflow furnace of the invention, said blowing ports and said suction ports are arranged in a panel in such manner that said plurality of the blowing ports are formed along a line called as a seal line perpendicular to carrying direction of the printed circuit board, said plurality of suction ports are formed along a line called as a first suction exclusive line inside of said seal line in each zone perpendicular to carrying direction of the printed circuit board, and said plurality of blowing ports and said plurality of are alternately formed in a area called as a mixed region inside of said first suction exclusive line in each zone.

In a sixth embodiment of the reflow furnace of the invention, said blowing ports in said mixed region are arranged to form pinnacles of a square, a rhombus, or a regular triangle.

In a seventh embodiment of the reflow furnace of the invention, a ratio of a pitch of said blowing ports to a diameter of said blowing port is set to be within a range from 2.5 to 8.0.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3A is a plan view showing a blowing panel according to one embodiment of the present invention, FIG. 3B is a sectional view of the blowing panel;

FIG. 6 is a view showing a relationship between a pitch of the blow ports and a diameter of the blowing port;

FIG. 11 is a view showing a horizontal length in a tapered portion of the blowing port in the experiment result 4; and FIG. 12 is a view showing a flow of an ambient gas in a conventional furnace.

DETAILED DESCRIPTION OF THE INVENTION

The embodiments of the present invention are described hereinafter in detail with reference to the accompanying drawings.

(Overall Description of the Reflow Furnace)

Figure 1:
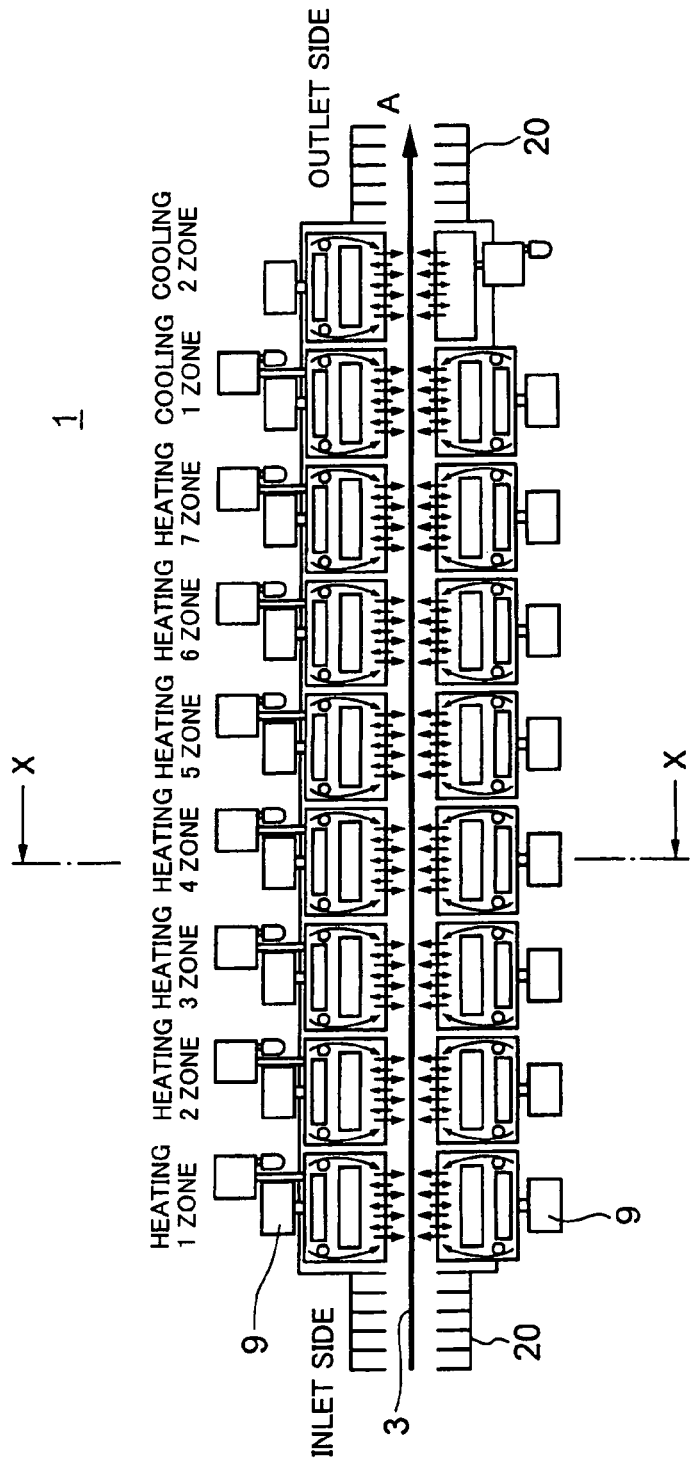
FIG. 1 is an overall view showing a reflow furnace according to one embodiment of the present invention.

FIG. 1 shows one embodiment of the reflow furnace with a heating device of the invention. The printed circuit board mounting (no shown) electronic components is horizontally carried by a carrier device 3 along a denoted arrow A within the reflow furnace 1. The reflow furnace includes seven heating zones and two cooling zones. The reflow furnace is sealed and the inside thereof is filled by an ambient gas. In order to secure the sealed condition in the furnace, there is provided an outside air infiltration prevention device called as a labyrinth 20 at an inlet (left hand side in the drawing) and an outlet (right hand side in the drawing) of the reflow furnace.

The printed circuit board is carried into the furnace through the inlet of the reflow furnace 1, preheated during being carried through the heating zones 1 to 3, and the solder in the printed circuit board is melt and soldered during being carried through the heating zones 4 to 7. Furthermore, the printed circuit board is cooled during being carried through the cooling zones 1 and 2, and then carried out of the outlet of the reflow furnace.

A heating device is provided with each of the heating zones 1 to 7 in the reflow furnace to heat by blowing a hot air to both of an upper face side and a lower face side of the printed circuit board carried in the furnace. A temperature control is carried out in the preheating zones 1 to 3 so that a temperature of the blowing ambient gas gradually becomes high. Each of the heating device has a substantially same construction.

(Description of the Heating Device)

Figure 2:
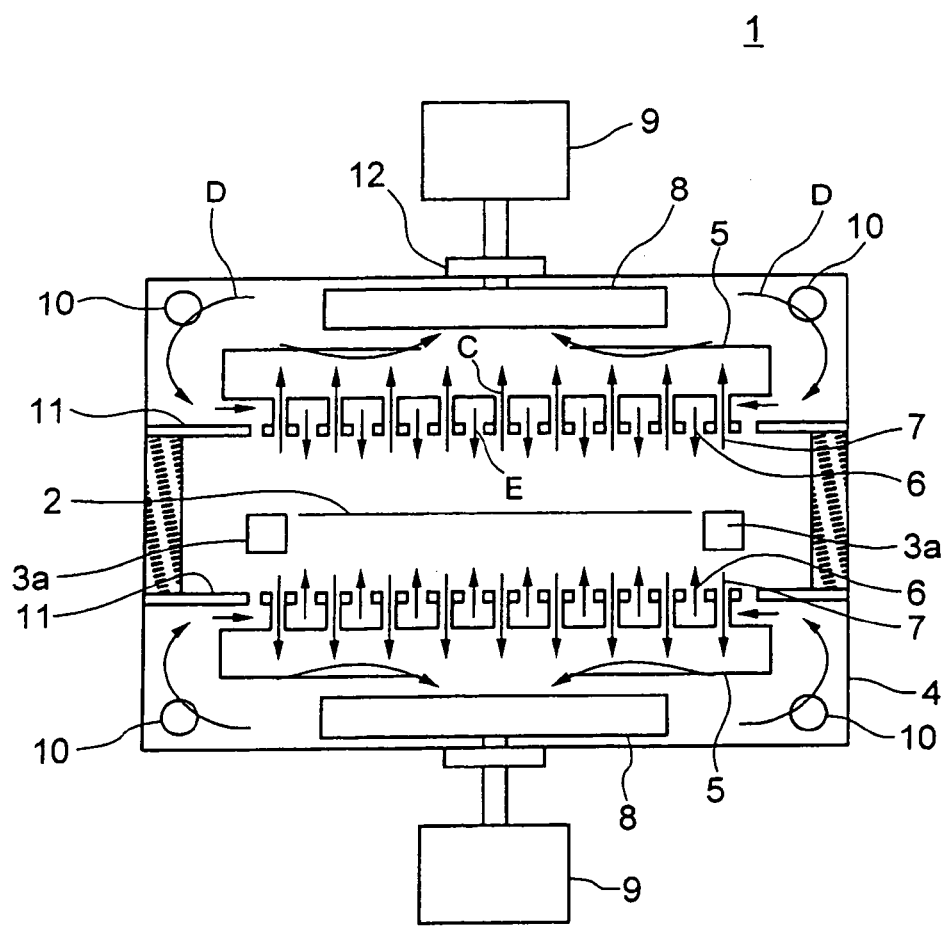
FIG. 2 is a sectional view showing a reflow furnace according to one embodiment of the present invention.

One embodiment of the heating device of the invention is described with reference to FIG. 2. FIG. 2 is a sectional view along X-X line in FIG. 1. Other heating zones have a substantially same construction.

The reflow furnace 1 is hermetically covered by the furnace wall, and the inside thereof is filled by the ambient gas. The printed circuit board 2 is carried in a forwarding direction in the paper by a carrying rail (carrier device) 3a provided in a center of the furnace. The heating device having the same construction is provided both of the upper surface side and a lower surface side of the carrier device 3a, respectively to heat the upper face and lower face of the printed circuit board. The heating device provided with the upper side of the carrier device is described as an example.

A hot air blowing nozzle (hereinafter referred to a blowing port 6, and a blowing panel 11 with cylindrical suction ports 7 are provided with an upper side of the carrier device 3a. A chamber 5 forming a space to suck the ambient gas is arranged above the blowing panel 11. In addition, there are arranged above the chamber a circulation fan 8 driven by a fan motor 9 to circulate the ambient gas in the furnace, and an electric heater 10 to heat the circulating ambient gas.

Although the fan motor is arranged outside the furnace 1, the outside air is prevented from infiltrating into the furnace by a hermetically sealing device 12.

A heating manner to heat the upper face of the printed circuit board 2 by the heating device is described hereunder.

The ambient gas positioned below the blowing panel in the furnace is sucked into the chamber 5 through the suction ports 7 by a suction force of the circulation fan as denoted by an arrow C. The sucked ambient gas flows along the inner wall of the furnace in both of the right hand and left hand directions by the circulation fan 8 as denoted by an arrow D, and is flown to both sides of the chamber 5. The ambient gas is heated to a prescribed temperature by the electric heater 10.

The heated ambient gas is blown downward through the blowing port 6 to the printed circuit board 2. The ambient gas is sucked again through the suction port 7 into the chamber 5, and the same circulation cycles are repeated.

As is clear from FIG. 2, the flow passage at the blowing side (positive pressure side) is placed outside of the flow passage of the suction side (negative pressure side) to realize an efficient flow of the ambient gas. According to the above arrangement, it is possible to provide a heating device excellent in hermetical sealing and maintainability, thus lowering the running cost or the like. In addition, the control of the suction pressure of the circulation fan 8 or the adjustment of the length of the cylindrical suction port makes to vary the line resistance, thus controlling the blowing pressure and the suction pressure in the blowing panel to specific values.

The heating device at the lower side of the printed circuit board 2 has a substantially same construction as that of the heating device at the upper side of the printed circuit board.

(Description of the Blowing Panel)

An embodiment of the blowing panel 11 with a plurality of blowing ports and a plurality of suction ports of the invention is described with reference to FIG. 3.

FIG. 3A is a plan view showing the bottom of the blowing panel 11, i.e., a view showing the blowing panel seen from the lower side of the heating zone. The printed circuit board is carried in a direction as denoted by an arrow A in FIG. 3A. The reference numerals 6a, 6b denote the blowing port, and the reference numerals 7a, 7b, 7c denote the suction port.

FIG. 3B is a side view of the blowing panel. More specifically, FIG. 3B shows a relative position of the carrier rail 3a in a width direction in the cross section of the reflow furnace, the printed circuit board 2 and the blowing panel 11. The plurality of the blowing ports 6 and the plurality of the suction ports 7 are arranged so as to be positioned in the same plane in this embodiment. The printed circuit board moves in a direction perpendicular to the paper.

The arrow in FIG. 3B shows the flow direction of the ambient gas in the blowing panel 11. The downward flows through the blowing ports and the upward flows through the suction ports are respectively arranged so as to be alternate every other, as shown in FIG. 3B.

There are provided a seal line, a first suction exclusive line, and a mixed region in the blowing panel 11. The seal line is formed by a sequentially arranged blowing ports 6b in FIG. 3A. The first suction exclusive line is formed next to the seal line by a sequentially arranged suction ports 7b.

In this embodiment, the seal line and the first suction exclusive line are arranged to be a straight line, respectively. Both of the seal line and the first suction exclusive line are arranged perpendicular to a carrier direction denoted by an arrow A, and provided at the inlet end and the outlet end in the direction to which the printed circuit board is carried.

The ambient gas blown through the blowing ports on the seal line is sucked through the suction ports on the first suction exclusive line next to the seal line, thus functioning as an air curtain.

The blowing port 6a and the suction port 7a are arranged to be alternate every other in both of the longitudinal and lateral directions in the mixed region, as shown in FIG. 3A. Suction ports 7c are arranged to be a straight line called as a second suction exclusive line in the center portion of the blowing panel so as to increase the amount of the ambient gas to be sucked through the suction ports.

Figure 4:
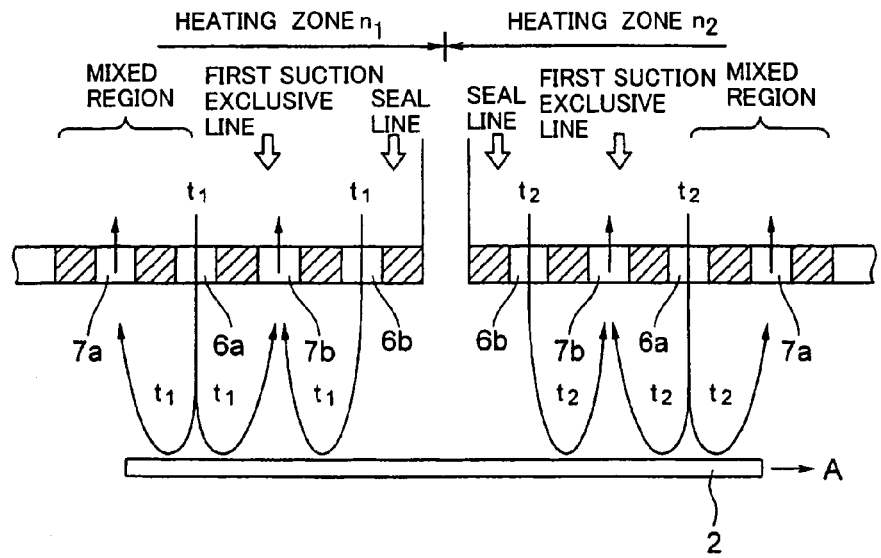
FIG. 4 is a view showing a flow of an ambient gas in a blowing port according to one embodiment of the present invention.

FIG. 4 schematically shows a relative location between the blowing panel 11 and the printed circuit board 2, as well as the flow of the blown ambient gas. The printed circuit board 2 is carried in a direction as denoted by an arrow A. The seal line is provided in a border portion between the heating zone n1 and the heating zone n2. The seal line is a train of the blowing ports 6b. The ambient gas heated to a temperature of t1 is blown through the blowing ports 6a, 6b in the heating zone n1. The blown ambient gas heats the printed circuit board 2, is reflected by the printed circuit board, and is sucked through the suction ports 7b in the first suction exclusive line.

The ambient gas with the temperature t1 blown out of the blowing port 6b in the heating zone n1 is sucked through the suction port 7b in the first suction exclusive line in the heating zone n1, the ambient gas with the temperature t1 is prevented from being mixed with the ambient gas with the temperature t2 in the heating zone n2.

Figure 5:
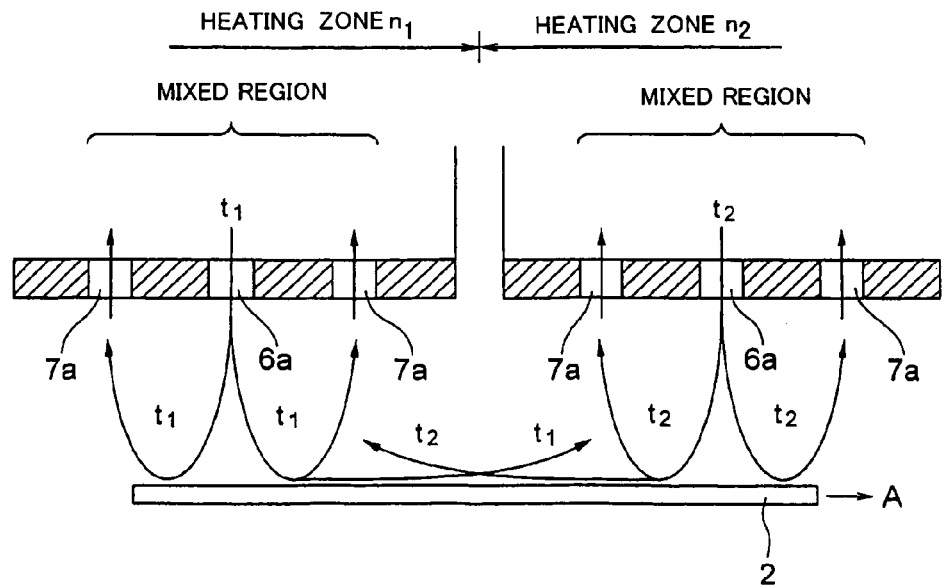
FIG. 5 is a view showing a flow of an ambient gas with no seal line and first suction exclusive line provided.

FIG. 5 schematically shows a flow of the ambient gas in the blowing panel without the seal line and the first suction exclusive line. If the blowing panel has neither seal line nor the first suction exclusive line, two mixed regions are located adjacent each other in the heating zones n1 and n2. The ambient gas blown through the blowing port 6a in the heating zones are mixed, as shown in FIG. 5, thus the temperature control in the respective heating zones becomes difficult.

In this embodiment, the blowing ports 6a are arranged to form pinnacles in the rhombus, as shown in FIG. 3A. The blowing ports 6a may be arranged to form pinnacles in the square, or the regular triangle. Together with the arrangement of the blowing ports, the suction ports 7a which are alternately arranged every other are arranged to form pinnacles of the square, rhombus, or regular triangle.

Since the blowing ports and the suction ports to the ambient gas are arranged in alternate every other, and uniformly arranged in the mixed region, it is possible to uniformly heat, and to solder with high quality, in addition, to obtain high heat efficiency.

Furthermore, since the blowing ports 6a and the suction ports 7a are arranged in alternate every other, and the seal line and the first suction exclusive line are arranged in the manner as described above, the occurrence of the disturbed flow of the ambient gas is reduced, in addition, the prescribed temperature of each of the zone in the furnace may be maintained, and the variation of the ambient gas pressure may be controlled to be small.

Furthermore, the inventors considered as follows:

The difference of the pitch of the arranged blowing ports 6a and suction ports 7a, a ratio of the total port area to the total area of the panel, a ratio of the blowing pressure to the suction pressure, the shape of the blowing port in the blowing panel 11 makes change the effect of the temperature rise of the printed circuit board.

More specifically, the inventors considered as follows, when the amount of the blowing flow of the ambient gas (i.e., the number of the blowing ports) are larger, the amount of heat is larger, thus heat transfer efficiency i.e., the speed of the temperature rise of the printed circuit board becomes higher. On the other hand, when the pitch of the blowing ports is too narrow, the adjacent blowing flows are interfered each other so that the heat flow does not reach to the printed circuit board, thus deteriorating the heat transfer. If the pitch of the blowing ports is set to be a prescribed value, the maximum heat transfer can be obtained.

Furthermore, the inventors considered as follows, in order to effectively such the ambient gas after the printed circuit board is heated, it is necessary to have a certain level of the suction port area. On the other hand, since the suction port comprises a non-heated portion, too large area of the suction port lowers the heat transfer efficiency. The maximum heat transfer efficiency may be obtained by setting the suction port and the blowing port to be a certain area ratio.

In order to surely introduce the returning ambient gas to the suction port, it is necessary to have a constant suction pressure, whereas the large suction pressure affects the flow of the blown ambient gas so that the sufficient heat flow does not reach to the printed circuit board. Furthermore, the too small suction pressure does not fully circulate the ambient gas in the furnace so that the disturbed flow of the ambient gas, and an airflow occur in the furnace to unstable the oxygen concentration in the furnace.

It becomes clear that the airflow occurs in the furnace when the exit of the blowing port has a certain level of chamfering. The inventors therefore carried out the various experiments to quantitatively understand the above described phenomenon. The experiment results are described with reference to FIGS. 7 to 10.

(Experiment Result 1)

The following experiments are carried out using a real nitrogen furnace type reflow furnace. The printed circuit board with the back side thereof insulated by an insulator is slowly carried by the in-furnace carrier device. Thermocouple thermometer is attached in advance to the surface of the printed circuit board to measure the transition of the surface temperature of the printed circuit board.

The temperature of the hot air of the ambient gas is set to be 170 degrees Celsius to measure the time required when the temperature of the printed circuit board rises to 100 degrees Celsius from 60 degrees Celsius. The time of the above temperature rise is shorter, the heating ability of the printed circuit board is higher.

Figure 7:
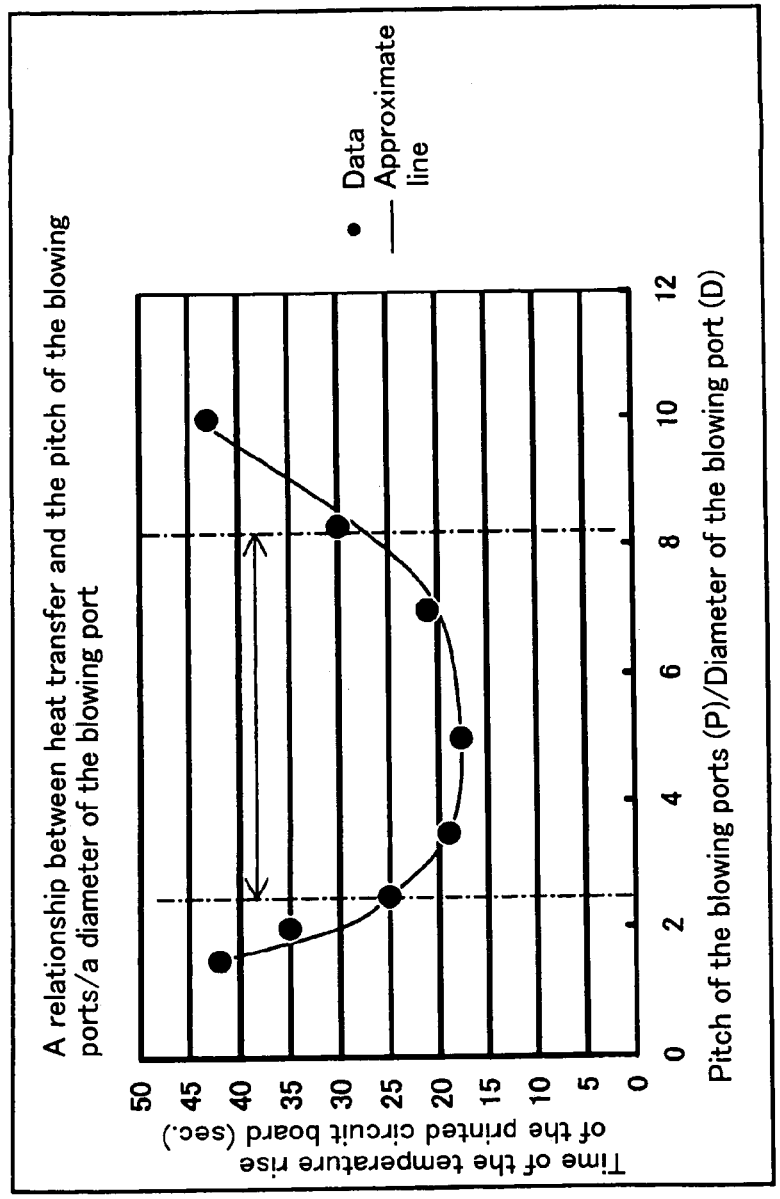
FIG. 7 is a view showing a relationship between a ratio of a pitch of the blowing ports to a diameter of the blowing port and a heat transfer in a printed circuit board in an experiment result 1.

FIG. 7 shows the above experiment result. In FIG. 7, the vertical axis depicts the time of the temperature rise from 60 degrees to 100 degrees Celsius of the printed circuit board (unit: second), and horizontal axis depicts a ratio of the pitch of the blowing ports to a diameter of the blowing port. The ratio of the pitch of the blowing ports to a diameter of the blowing port is depicted by a ratio of P to D (P/D) in FIG. 6.

FIG. 6A shows a relationship between P and D in an example in which a plurality of blowing ports are arranged to form pinnacles of the square. More specifically, the relationship between the distance P from the blowing port and adjacent other blowing port, and a diameter D of the blowing port is depicted. FIG. 6B shows a relationship between P and D in an example in which a plurality of blowing ports are arranged to form pinnacles of the rhombus. FIG. 6C shows a relationship between P and D in an example in which a plurality of blowing ports are arranged to form pinnacles of the regular triangle.

In FIG. 7, the time of temperature rise (second) of the printed circuit board are plotted, in which a ratio of the pitch of the blowing ports and a diameter of the blowing port is varied from 1.5 to 10.0. As is clear from FIG. 7, when the ratio of the pitch of the blowing ports and the diameter of the blowing port is set to be within a range of 2.5 to 8.0, the time of temperature rise of the printed circuit board is small, thus the heat transfer efficiency of the printed circuit board by the hot air is improved.

(Experiment Result 2)

The time of the temperature rise of the printed circuit board are investigated, in which a ratio of a total area (A) of the plurality of suction ports to a total area (B) of the plurality of blowing ports is varied, according to the same method as the above experiment 1.

Here, the total area of the suction ports means a total of the port area of the suction port 7a, 7b, 7c in FIG. 3A, and the total area of blowing ports means a total of the port area of the blowing ports 6a, 6b in FIG. 3A.

Figure 8:
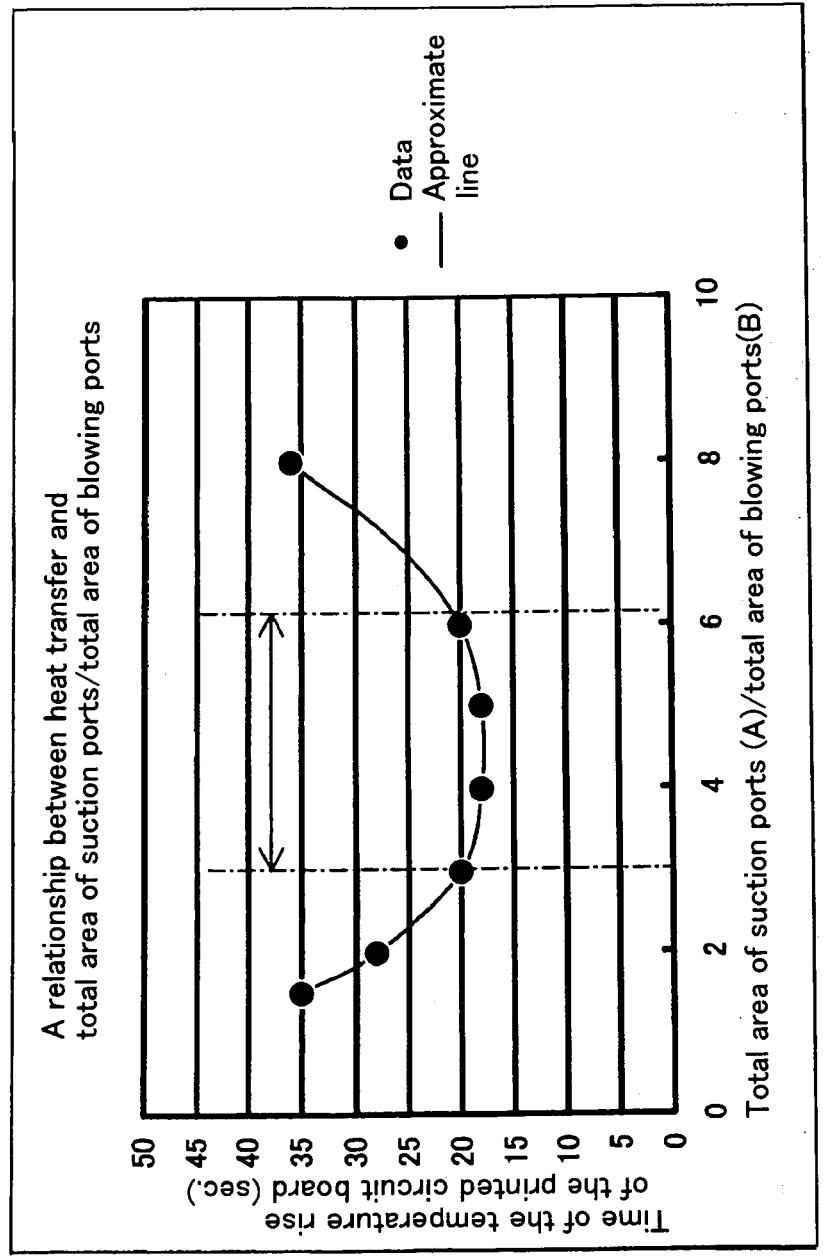
FIG. 8 is a view showing a ratio of a total area of the blowing ports to a total area of the suction ports and a heat transfer in a printed circuit board in an experiment result 2.

In FIG. 8, the time of temperature rise of the printed circuit board are plotted, in which a ratio A/B of the total area (A) of the plurality of suction ports to the total area (B) of the plurality of blowing ports is varied from 1.5 to 8.0.

As is clear from FIG. 8, when the ratio A/B is set to be within a range of 3.0 to 6.0, the time of temperature rise of the printed circuit board is small, thus the heat transfer efficiency of the printed circuit board by the hot air is improved.

(Experiment Result 3)

The time of the temperature rise of the printed circuit board and the oxygen concentration in the furnace are investigated, in which a ratio of a blowing pressure (PA) of the ambient gas through the blowing port to a suction pressure through the suction port (PB) is varied, according to the same method as the above experiment 1.

Figure 9:
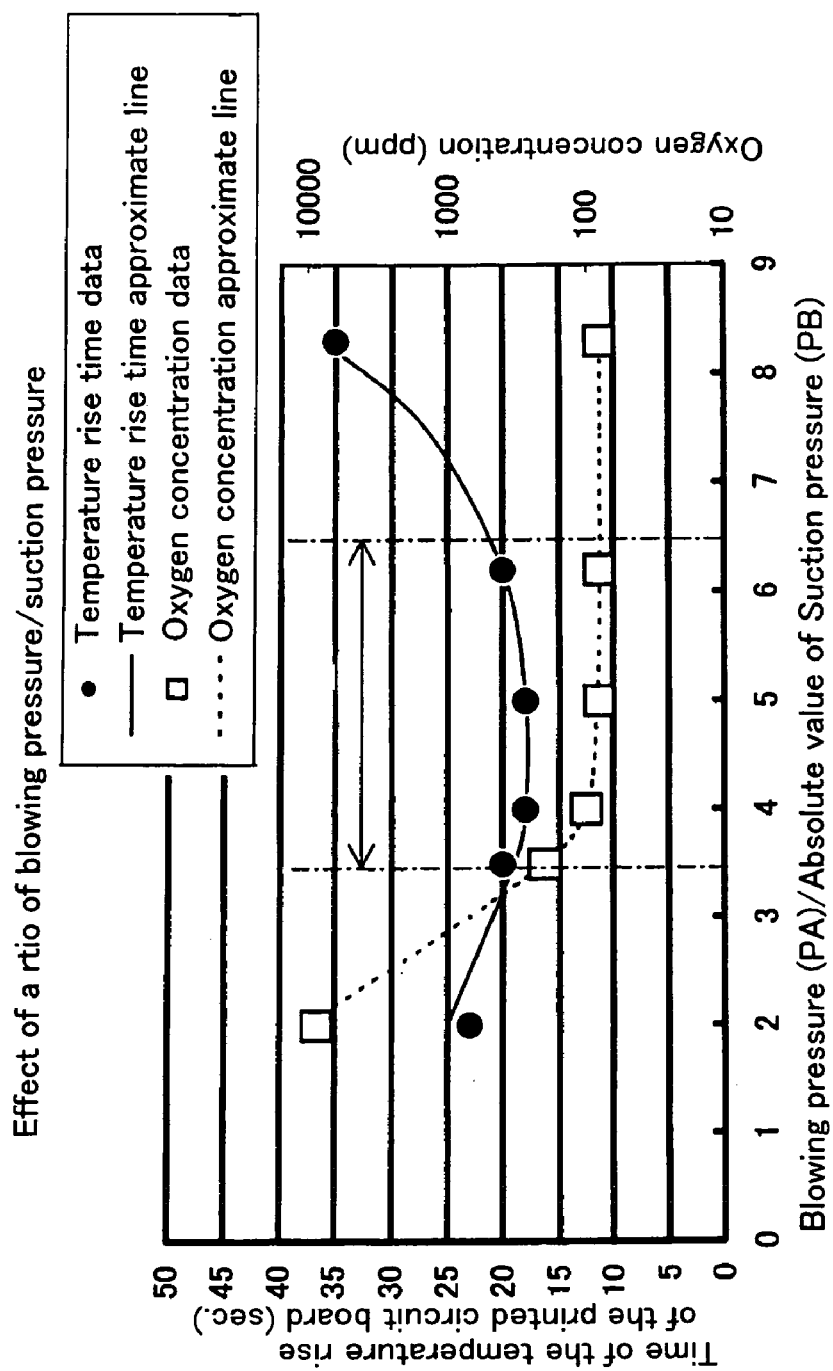
FIG. 9 is a view showing a ratio of a blowing pressure to a suction pressure, a heat transfer in a printed circuit board and an oxygen concentration in the furnace in an experiment result 3.

In FIG. 9, the time of temperature rise of the printed circuit board are plotted in black circles and the oxygen concentration in the furnace are plotted in white squares, in which a ratio PA/PB of the blowing pressure (PA) of the ambient gas through the blowing port to the suction pressure through the suction port (absolute value, PB) is varied from 2.0 to 8.3.

As is clear from FIG. 9, when the ratio PA/PB is set to be within a range of 3.5 to 6.5, the time of temperature rise of the printed circuit board is small, and the oxygen concentration is controlled to be low.

(Experiment Result 4)

The oxygen concentration is investigated, in which the shapes of the chamfering of the exit of the blowing port is varied using the same reflow furnace as the above experiment. Here, the size C of the chamfering of the blowing port is described with reference to FIG. 11. FIG. 11A is an expanded view of the blowing port 6 (see FIG. 3A) and the vicinity thereof in the blowing panel 11. The suction port is omitted in the drawing in order to simplify the explanation.

FIG. 11B is a sectional view of the blowing port 6. The arrow depicts a direction of the heated ambient gas flow. The reference character C depicts the size (unit: mm) of the chamfering. Here, the diameter D of the blowing port is 4 mm.

Figure 10:
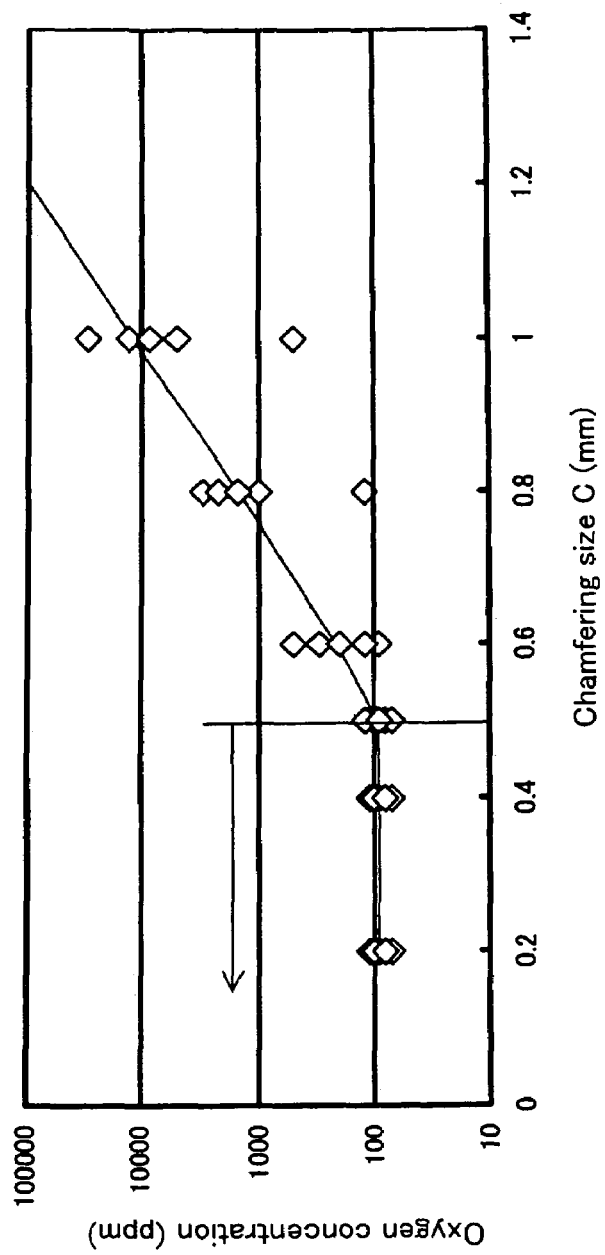
FIG. 10 is a view showing a relationship between a horizontal length in a tapered portion of the blowing port and an oxygen concentration in a furnace in an experiment result 4.

In FIG. 10, the oxygen concentrations (ppm) in the furnace are plotted, in which the chamfering size C at the exit of the blowing port is varied from 0.2 mm to 1.0 mm. The straight line in the drawing shows approximation line of the data.

As is clear from FIG. 10, it is understand that the oxygen concentration in the furnace rises when the chamfering size C is over 0.5 mm. More specifically, it is understood that it is necessary to control the chamfering size of the blowing port in the blowing panel to be up to 0.5 mm in order to prevent the air flow of the ambient gas in the furnace from being generated.

From the above experiments, the followings become clear:
(1) The heat transfer efficiency to the printed circuit board is improved when the ratio of the pitch (P) of the blowing ports to the diameter (D) of the blowing port is set to be within a range of 2.5 to 8.0.
(2) The heat transfer efficiency to the printed circuit board is improved when the ratio of the total area of the suction ports (A) to the total area of the blowing ports (B) is set to be within a range of 3.0 to 6.0.
(3) The heat transfer efficiency to the printed circuit board is improved when the ratio of the blowing pressure (PA) to the absolute value of the suction pressure (PB) is set to be within a range of 3.5 to 6.5.
(4) The air flow of the ambient gas in the furnace is prevented from being generated, and the oxygen concentration is prevented from rising when the chamfering size C at the exit of the blowing port is set to be up to 0.5 mm.

The above described features may be combined and carried out. More specifically, two or more of the above described features (1) to (4) are combined and carried out so as to improve the heat transfer efficiency to the printed circuit board, and to obtain the effect of preventing the oxygen concentration in the furnace from rising.

The present invention is not limited to the above described embodiments, and various variations and modifications may be possible without departing from the scope of the present invention.

This application is based on the Japanese Patent Application No. 2005-192710 filed on Jun. 30, 2005, entire content of which is expressly incorporated by reference herein.

What is claimed is:

1. A reflow furnace heating a printed circuit board carried by a carrier device, the furnace comprising:
a circulation fan to circulate an ambient gas;
a heater to heat the ambient gas;
a plurality of blowing ports having a prescribed total area to blow the ambient gas heated by the heater to a printed circuit board; and
a plurality of suction ports having a prescribed total area to suck the ambient gas, a ratio of the total area of the suction ports to the total area of the blowing ports being within a range from 3.0 to 6.0, wherein
said plurality of blowing ports and said plurality of suction ports are arranged on a panel such that said plurality of blowing ports are arranged along a seal line along outer edges of said panel perpendicular to a carrying direction of the printed circuit board, said plurality of suction ports are arranged along a first suction exclusive line on an inside of said seal line in each outer edge of said panel perpendicular to the carrying direction of the printed circuit board, and said plurality of blowing ports and said plurality of suction ports are alternately arranged in a mixed region inside of each of said first suction exclusive lines.

2. The reflow furnace according to claim 1, wherein the plurality of blowing ports each include a tapered portion which has a horizontal length of up to 0.5 mm at an outlet thereof.

3. The reflow furnace according to claim 1, wherein a ratio of a blowing pressure of the ambient gas at the plurality of blowing ports to a suction pressure of the ambient gas at the plurality of suction ports is within a range from 3.5 to 6.5.

4. The reflow furnace according to claim 3, wherein the plurality of blowing ports each include a tapered portion which has a horizontal length of up to 0.5 mm at an outlet thereof.

5. The reflow furnace according to claim 1, wherein said plurality of blowing ports and said plurality of suction ports are provided on a same plane.

6. The reflow furnace according to claim 1, wherein said plurality of blowing ports in said mixed region are arranged to form vertices of a square, a rhombus, or a regular triangle.

7. The reflow furnace according to claim 6, wherein a ratio of a pitch of said plurality of blowing ports to a diameter of said plurality of blowing ports is within a range from 2.5 to 8.0.

8. A reflow furnace heating a printed circuit board carried by a carrier device, the furnace comprising:
a circulation fan to circulate an ambient gas;
a heater to heat the ambient gas;
a plurality of blowing ports each having a tapered portion which has a horizontal length of up to 0.5 mm at an outlet to blow the ambient gas heated by the heater to a printed circuit board; and
a plurality of suction ports to suck the ambient gas, wherein
said plurality of blowing Ports and said plurality of suction ports are arranged on a panel such that said plurality of blowing ports are arranged along a seal line along outer edges of said panel perpendicular to a carrying direction of the printed circuit board, said plurality of suction ports are arranged along a first suction exclusive line on an inside of said seal line in each outer edge of said panel perpendicular to the carrying direction of the printed circuit board, and said plurality of blowing ports and said plurality of suction ports are alternately arranged in a mixed region inside of each of said first suction exclusive lines.

9. The reflow furnace according to claim 8, wherein a ratio of a blowing pressure of the ambient gas at the plurality of blowing ports to a suction pressure of the ambient gas at the plurality of suction ports is within a range from 3.5 to 6.5.

10. The reflow furnace according to claim 8, wherein said plurality of blowing ports in said mixed region are arranged to form vertices of a square, a rhombus, or a regular triangle.

11. The reflow furnace according to claim 8, wherein a ratio of a pitch of said plurality of blowing ports to a diameter of said plurality of blowing ports is within a range from 2.5 to 8.0.

12. The reflow furnace according to claim 8, wherein a ratio of the total area of the suction ports to the total area of the blowing ports is within a range from 3.0 to 6.0.

13. The reflow furnace according to claim 8, wherein said plurality of blowing ports and said plurality of suction ports are provided on a same plane.

14. A reflow furnace heating a printed circuit board carried by a carrier device, the furnace comprising:
a circulation fan to circulate an ambient gas;
a heater to heat the ambient gas;

a plurality of blowing ports to blow the ambient gas heated by the heater under a prescribed pressure to a printed circuit board;

a plurality of suction ports to suck the ambient gas under a prescribed pressure, a ratio of a blowing pressure of the ambient gas at the blowing ports to a suction pressure of the ambient gas at the suction ports being set to be within a range from 3.5 to 6.5, wherein said plurality of blowing ports and said plurality of suction ports are arranged on a panel such that said plurality of blowing ports are arranged along a seal line along outer edges of said panel perpendicular to a carrying direction of the printed circuit board, said plurality of suction ports are arranged along a first suction exclusive line on an inside of said seal line in each outer edge of said panel perpendicular to the carrying direction of the printed circuit board, and said plurality of blowing ports and said plurality of suction ports are alternately arranged in a mixed region inside of each of said first suction exclusive lines.

15. The reflow furnace according to claim 14, wherein said plurality of blowing ports in said mixed region are arranged to form vertices of a square, a rhombus, or a regular triangle.

16. The reflow furnace according to claim 14, wherein the plurality of blowing ports each include a tapered portion which has a horizontal length of up to 0.5 mm at an outlet thereof.

17. The reflow furnace according to claim 14, wherein a ratio of a pitch of said plurality of blowing ports to a diameter of said plurality of blowing ports is within a range from 2.5 to 8.0.

18. The reflow furnace according to claim 14, wherein a ratio of the total area of the suction ports to the total area of the blowing ports is within a range from 3.0 to 6.0.

19. The reflow furnace according to claim 14, wherein said plurality of blowing ports and said plurality of suction ports are provided on a same plane.

* * * * *